United States Patent
Udayashankar et al.

(10) Patent No.: US 11,550,463 B2
(45) Date of Patent: Jan. 10, 2023

(54) ADAPTIVE TIME BAR WITH DYNAMIC DATA DISPLAY

(71) Applicant: SAP SE, Walldorf (DE)

(72) Inventors: Poshith Udayashankar, Bangalore (IN); Vibin Varghese, Bangalore (IN)

(73) Assignee: SAP SE, Walldorf (DE)

( * ) Notice: Subject to any disclaimer, the term of this patent is extended or adjusted under 35 U.S.C. 154(b) by 34 days.

(21) Appl. No.: 17/182,311

(22) Filed: Feb. 23, 2021

(65) Prior Publication Data

US 2022/0269399 A1    Aug. 25, 2022

(51) Int. Cl.
*G06F 3/04847* (2022.01)
*G06F 3/0485* (2022.01)
*G06F 3/04855* (2022.01)

(52) U.S. Cl.
CPC ........ *G06F 3/04847* (2013.01); *G06F 3/0485* (2013.01); *G06F 3/04855* (2013.01)

(58) Field of Classification Search
None
See application file for complete search history.

(56) References Cited

U.S. PATENT DOCUMENTS

| | | | | |
|---|---|---|---|---|
| 9,652,117 B2* | 5/2017 | Brown | ................... | G06F 3/0482 |
| 2005/0261999 A1* | 11/2005 | Rowady | ................. | G06Q 40/00 |
| | | | | 705/35 |
| 2006/0294473 A1* | 12/2006 | Keely | ................... | G06F 3/0485 |
| | | | | 715/776 |
| 2009/0177998 A1* | 7/2009 | Barrios | ............... | G06F 3/04855 |
| | | | | 715/799 |
| 2011/0167369 A1* | 7/2011 | van Os | ............... | G06F 3/04842 |
| | | | | 715/833 |
| 2011/0258569 A1* | 10/2011 | Weir | ................. | G06F 16/90328 |
| | | | | 715/771 |

(Continued)

OTHER PUBLICATIONS

Costa, R. (Nov. 17, 2020). Slider design UI patterns and examples. Justinmind. Retrieved May 2, 2022 from https://www.justinmind.com/blog/slider-design-web/. (Year: 2020).*

(Continued)

*Primary Examiner* — Linda Huynh
(74) *Attorney, Agent, or Firm* — Buckley, Maschoff & Talwalker LLC

(57) ABSTRACT

Provided are systems and methods for a dynamic data display that includes a linear time bar with indents and a handle capable of being manipulated by a user. In one example, the method includes one or more of displaying the time bar within a user interface which includes a plurality of indents representing a plurality of intermediate time units arranged between first and second numerical values, and a handle disposed over an indent of a currently selected time unit, displaying graphical modules via the user interface, wherein the graphical modules comprise visualizations of data based on the currently selected time unit, detecting, via a user input on the user interface, movement of the handle to a different selected time unit from among the plurality of intermediate time units, and in response to the detected movement, dynamically modifying the graphical modules based on the different selected time unit.

21 Claims, 14 Drawing Sheets

(56) References Cited

U.S. PATENT DOCUMENTS

| | | | | |
|---|---|---|---|---|
| 2012/0078665 | A1* | 3/2012 | Johnson | G16H 30/20 |
| | | | | 345/473 |
| 2014/0059495 | A1* | 2/2014 | Klaus | G06F 16/248 |
| | | | | 715/841 |
| 2015/0277718 | A1* | 10/2015 | Lauer | G06F 3/04847 |
| | | | | 715/833 |
| 2018/0039398 | A1* | 2/2018 | Schaerges | G06F 3/04847 |
| 2018/0107367 | A1* | 4/2018 | Rinneberg | G06F 3/0488 |
| 2019/0115103 | A1* | 4/2019 | Nilsson | A61M 1/1621 |
| 2019/0212904 | A1* | 7/2019 | Geller | G06F 3/0486 |
| 2019/0213763 | A1* | 7/2019 | Geller | G06F 16/9024 |
| 2019/0391707 | A1* | 12/2019 | Ristow | G06F 21/31 |

OTHER PUBLICATIONS

Friedman, V. (Jul. 19, 2017). Designing the perfect slider. Smashing Magazine. Retrieved Sep. 21, 2022 from https://www.smashingmagazine.com/2017/07/designing-perfect-slider/. (Year: 2017).*

* cited by examiner

Germany   France   Italy                              ▶ P6

Tax Payable 29.2k 210A    Tax Receivable 19.8k 220A    Net Payable 8.3k 230A Payments Due 240A
57.3k Due in 20 days
View All Pending Reports 250A
8 Due in 3 days
View All Pending Refunds 260A
15.2k Between 25 months
View All FIG. 2B
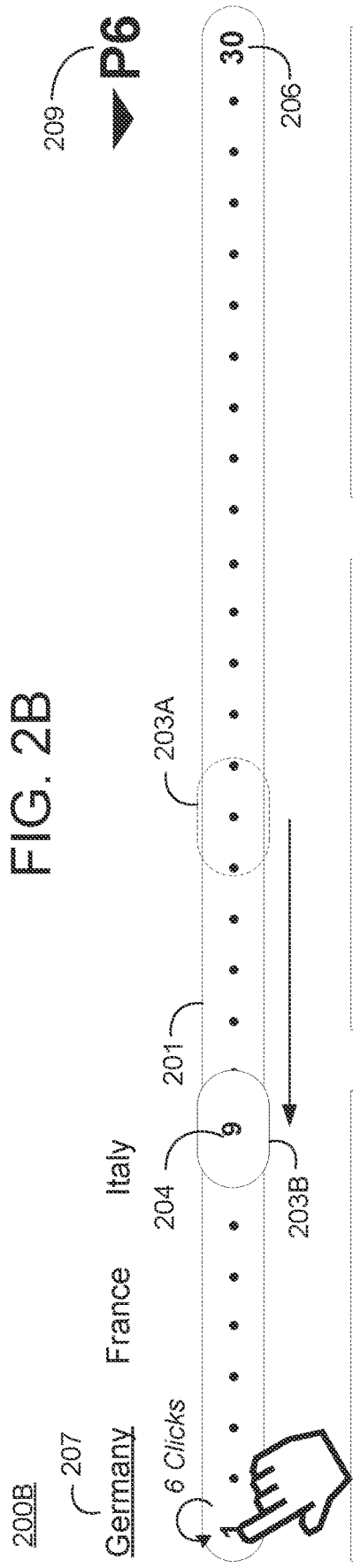
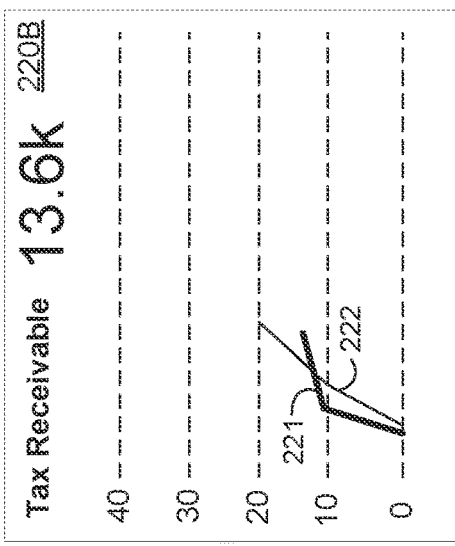
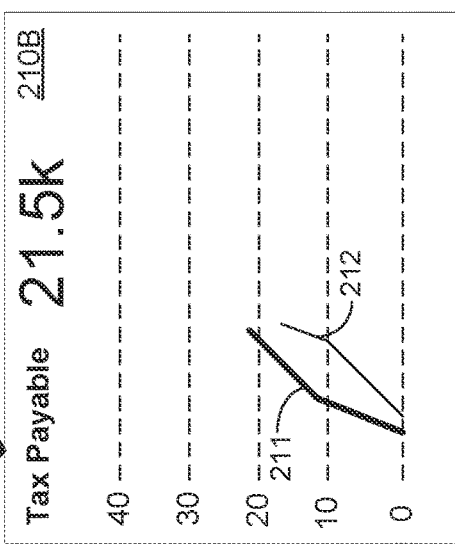

FIG. 2C
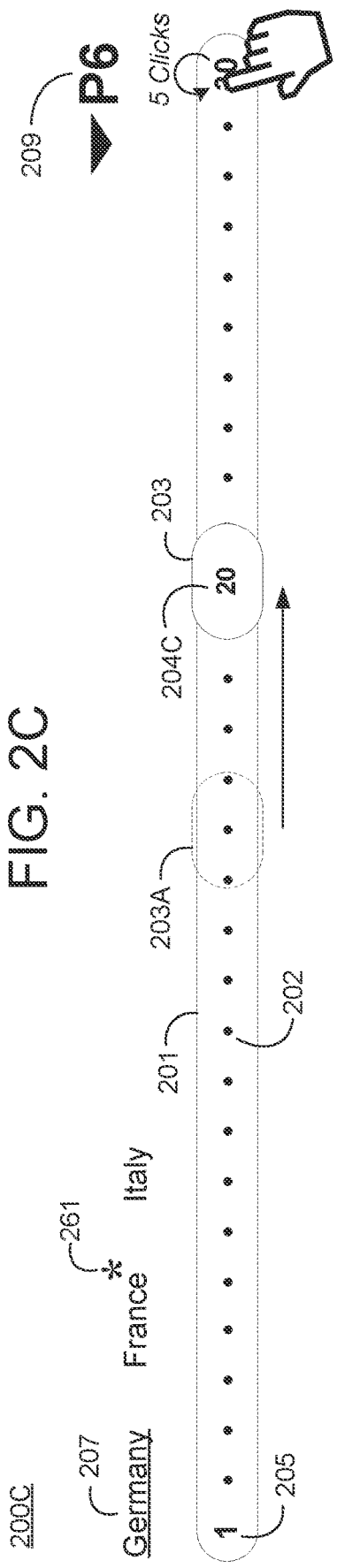
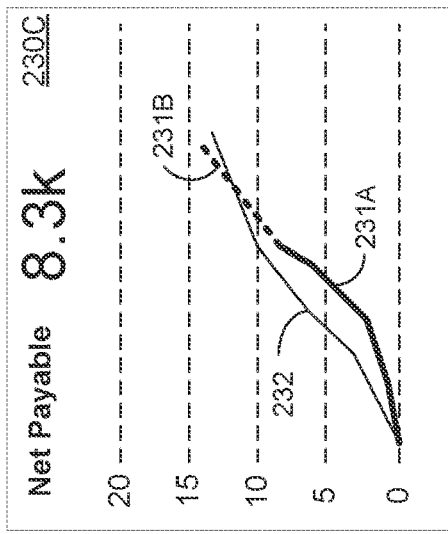
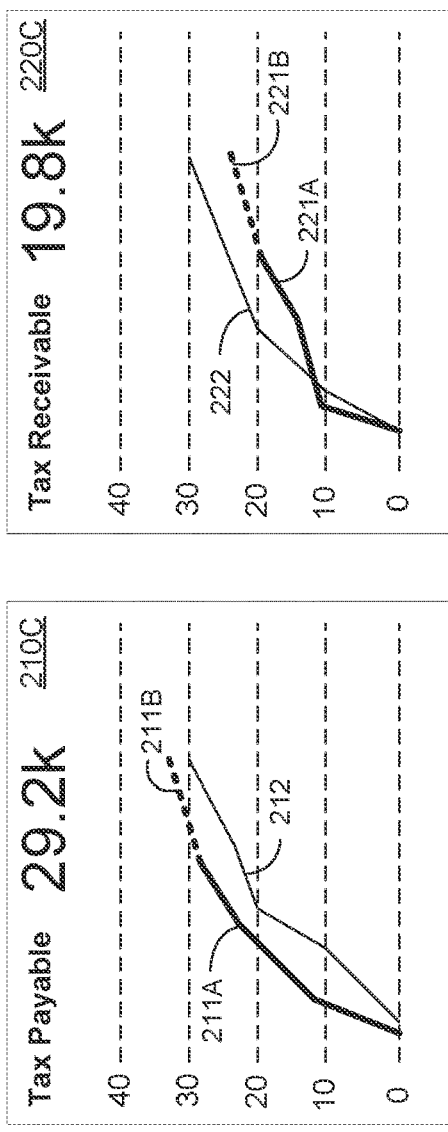
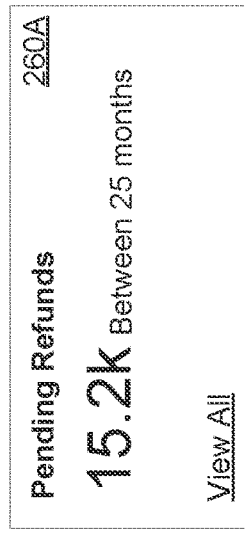
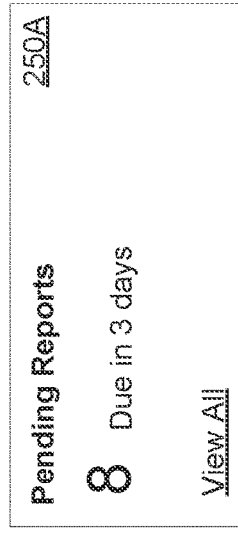
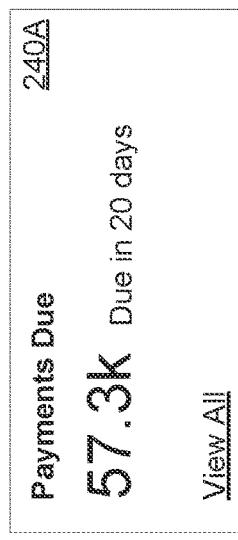

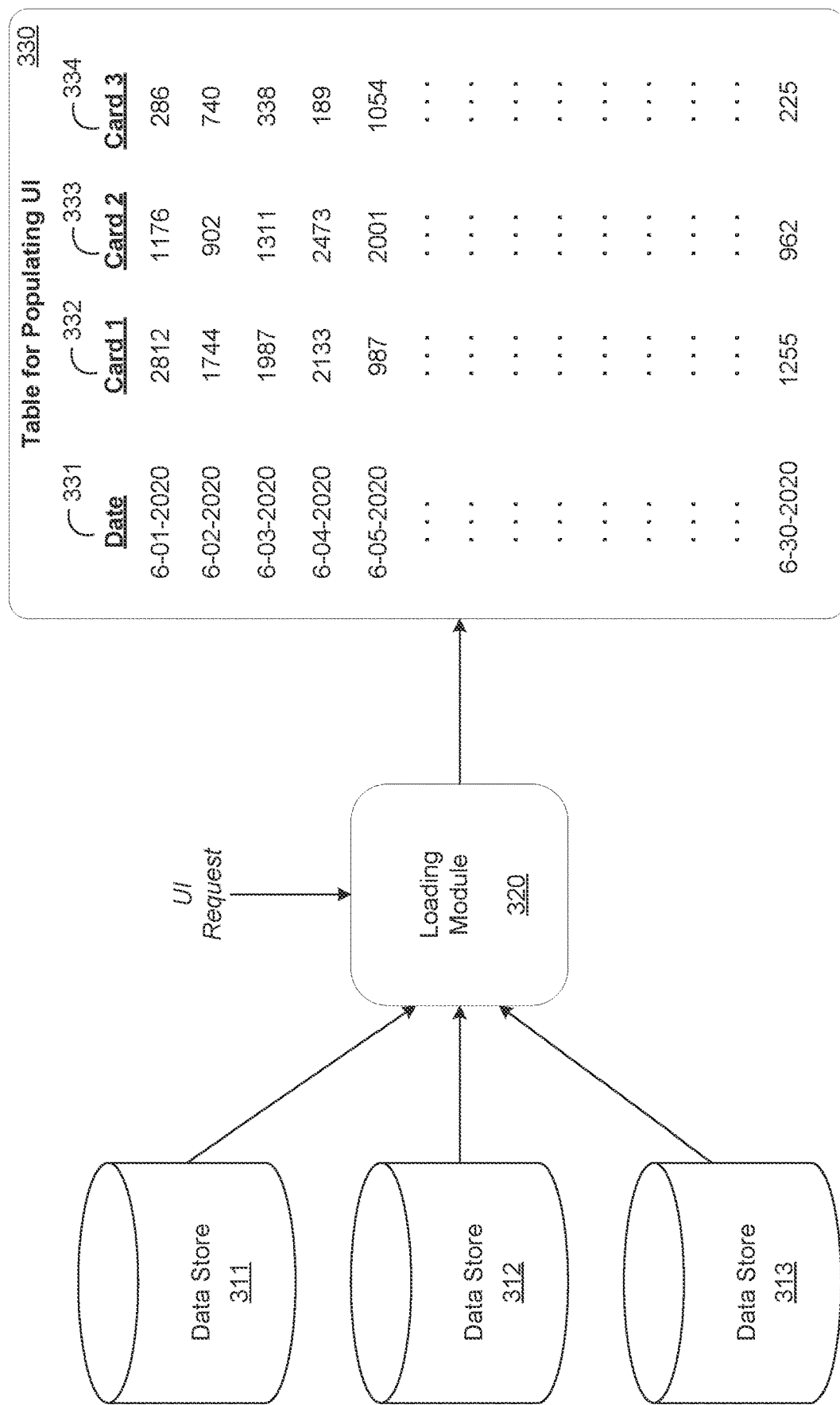

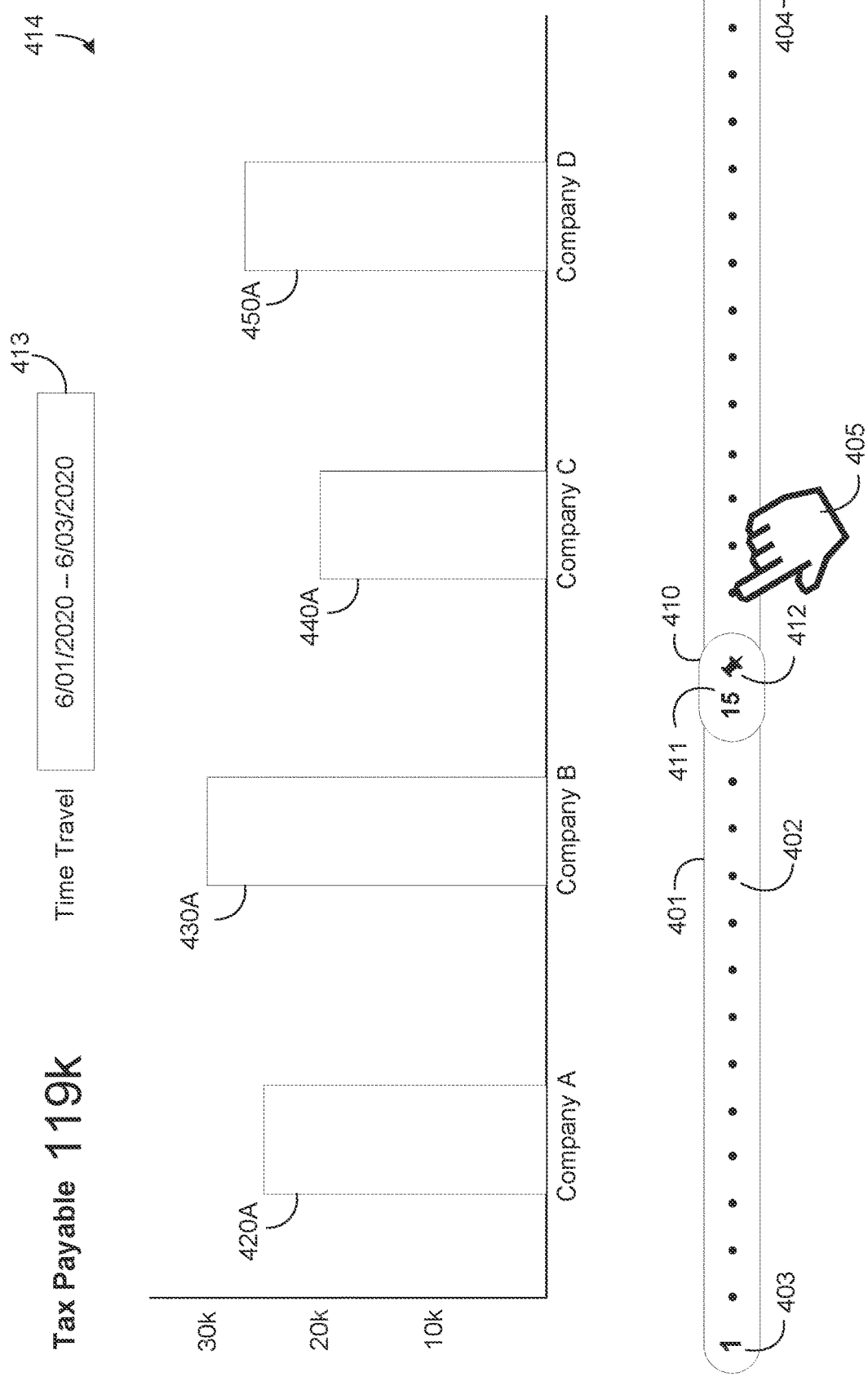

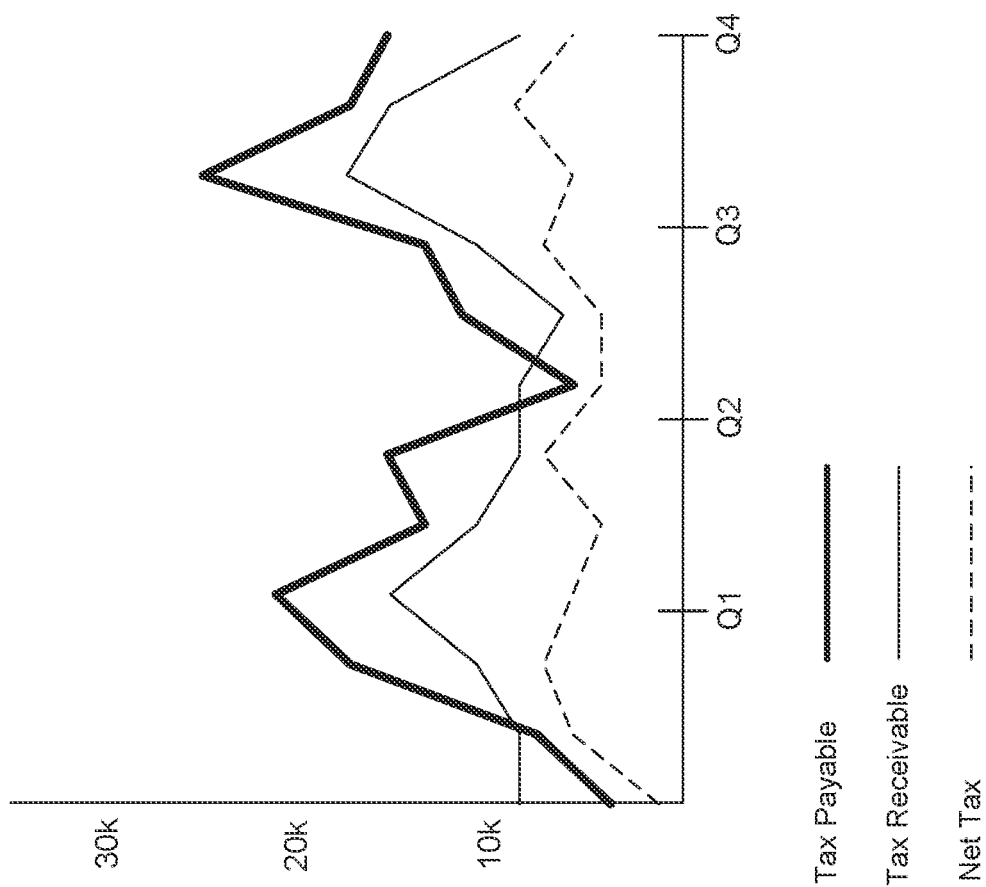

610
Displaying a Time Bar Including Indents Horizontally Arranged Between First and Second Time Units and a Handle on the Time Bar 620
Displaying Graphical Modules of Time-Series Data 630
Detecting Movement of a Handle Along the Time Bar to an Indent of a Different Time Unit 640
Dynamically Modifying the Time-Series Data within the Graphical Modules based on the Different Time Unit

ADAPTIVE TIME BAR WITH DYNAMIC DATA DISPLAY

BACKGROUND

Visualizing time-series data often involves graphs. For example, a value may be graphed over time to visualize changes in the value. When a user wants to compare the changes of the data value during two different periods of time, the user must open a first window illustrating a first graph of the data value during a first period of time and a second window illustrating a second graph of the data value during a second period of time. This process requires the user to find enough screen space for both graphs at the same time, otherwise the user must switch back and forth between the first and second windows on the display.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 2A-2C are diagrams illustrating processes of interacting with a user interface including a time bar and display modules in accordance with an example embodiment.

FIG. 3 is a diagram illustrating a process of loading data for populating a user interface in accordance with an example embodiment.

FIGS. 4A-4B are diagrams illustrating processes of interacting with a user interface including a time bar and bar graphs in accordance with example embodiments.

FIGS. 5A-5B are diagrams illustrating a process of modifying a scale of a display in accordance with another example embodiment.

FIG. 6 is a diagram illustrating a method of interacting with a time bar in accordance with an example embodiment.

Figure 1:
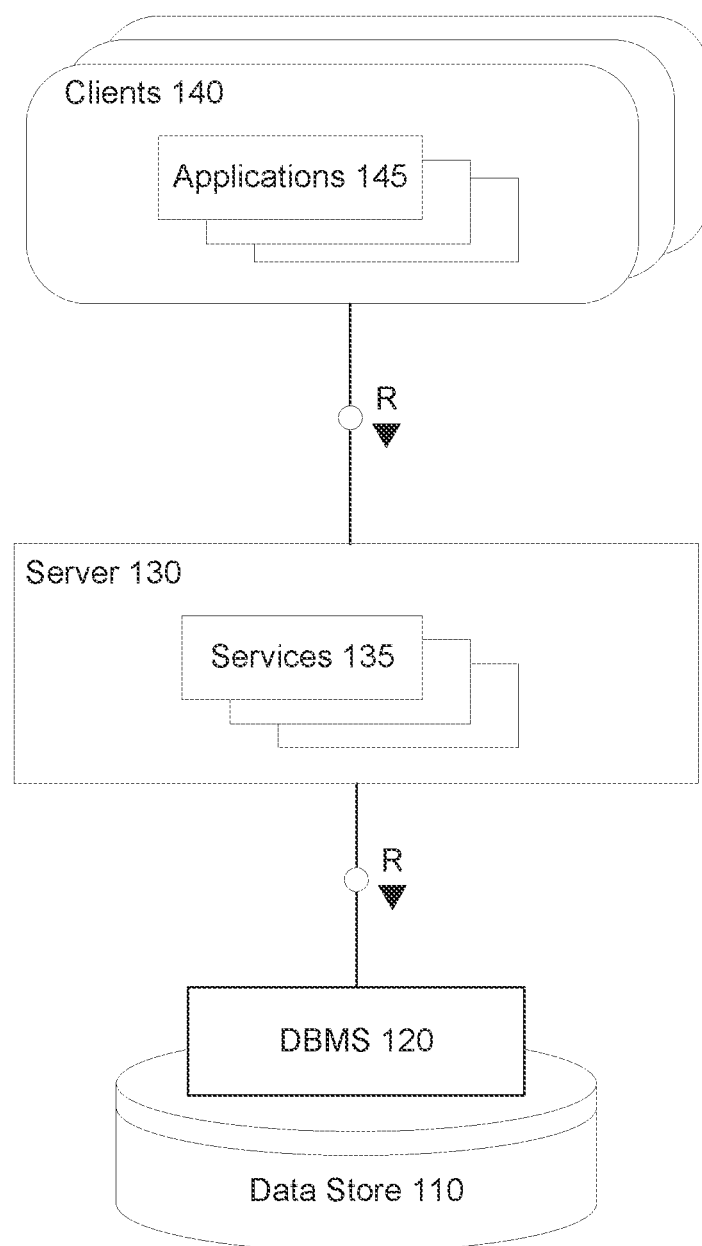
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to an intuitive user interface (dashboard) which includes a scrollable time bar (e.g., days on a calendar, months of a year, quarters of a year, years of a decade, etc.) and multiple display modules (cards) with data displayed therein based on a time unit that is selected on the time bar. When a user manipulates a handle (also referred to as a scroll handle, knob, button, etc.) along the time bar, the data displayed within the multi-card dashboard dynamically changes according to the selected time unit on the time bar. The time bar enables a user to travel through time and view changes to multiple data values at the same time in a graphical manner, in some embodiments, the dynamic changes include re-ordering of cards, populating the cards and the data within the cards dynamically based on the events of the selected time unit, and the like. One or more of the cards may display data statically, regardless of the movement of the handle on the time bar. For example, the static data may include critical data (urgent deadlines, etc.) that are important.

The time bar may include a horizontal arrangement of time units. As another example, the time units may be arranged vertically, although the examples herein show the horizontal arrangement. In some embodiments, the time units may be represented as "indents" which include non-identifying markers such as dots, squares, symbols, tabs, etc. The indents may be spaced apart an equal distance with blank spaces in between the indents. The time bar may also display numerical values (representing time values) of the first and last time units on the time bar instead of displaying indents for the first and last time units. By using numerical values on the first and last time units instead of indents, the user is given a point of reference for the remaining indents. The indents and the numerical values may be arranged at a same height with the indents disposed in between the first and second numerical values. That is, the indents and the numerical values may be arranged on a common horizontal plane.

The system may overlay a handle (graphical button) on top of the time bar. The handle may initialized/displayed on a current time unit which can be extracted from a system clock. For example, if the time bar includes time units (29 indents and 2 numerical values) representing 31 days of a month, the handle can be disposed on a day of a current day of the month as pulled from the system clock. The handle may include a solid colored background (e.g., white, grey, blue, orange, etc.). Embedded within the solid colored background of the handle is a numerical value of the currently selected indent.

The handle is configured to scroll along the time bar. The user can move the handle horizontally along the time bar by placing a cursor on top of the handle, selecting the handle with an input means (e.g., a mouse or touch input), and holding down the input means, and dragging the handle left or right on the screen. As another example, the user move the handle leftward (back in time) by placing an input means over the first numerical value on the time bar representing the first unit of time and clicking on the first numerical value which causes the handle to slide leftward along the time bar. As another example, the user can move the handle rightward (forward in time) by placing an input means over the second numerical value on the time bar representing the last unit of time and clicking on the second numerical value which causes the handle to slide leftward along the time bar. The handle may move over a number of indents corresponding to a number of clicks. For example, if the user clicks on the first numerical value 5 times, the handle may slide over 5 indents (5 units of time). In this example, the click is a quick press and release of the input (e.g., of the mouse button or the touch on the screen).

As another example, if the user presses and holds a numerical value for a predetermined period of time, the handle can slide across multiple indents at once. For example, the system may highlight various indents on the time bar by increasing a size of the highlighted indents, changing a color of the highlighted indents, and/or the like. The highlighted indents may correspond to days with important actions/events such as deadlines, due dates, reminders, and the like. Here, the highlighted indents may be intermittently disposed on the time bar where some indents are highlighted and some are not highlighted. By pressing and holding on the numerical value, the user can skip to a next highlighted indent. For example, if the handle is currently disposed on the $20^{th}$ time unit, and the $24^{th}$ time unit is highlighted, by pressing and holding on the second numerical value on the time bar (e.g., the last time unit) for a predetermined period of time (e.g., 2 seconds, 3 seconds, etc.), the handle may skip from the $20^{th}$ time unit ($19^{th}$ indent) to the $23^{rd}$ indent representing the $24^{th}$ time unit. Likewise, the data populated within the cards may skip from the data corresponding to the $20^{th}$ time unit to the data corresponding to the $24^{th}$ time unit.

The cards may include time-series data that represents a change in value of a data variable over time. For example, one card may have a sales data value, another card may have an expenses data value, another card may have a taxes owed value, etc. These data values may be graphed over time based on the time unit selected on the time bar. For example, a user may select the month of April on the time bar for a given year. Here, the time bar may display a time bar with 30 time units (a numerical value, 28 intermediate indents, and a $2^{nd}$ numerical value). When the user moves the handle along the time bar, the user may be selecting how much data they wish to view from among the selected time period of April. For example, if the user has the handle on the $14^{th}$ day ($13^{th}$ indent), the cards may display a change in value of the data values from the $1^{st}$ to the $14^{th}$ day of April. For example, one card may have a change in the sales data value as it changes accumulates from the V day to the $1^{st}$ day. Likewise, another card may have a change in the expenses data value as it accumulates from the $1^{st}$ day to the $14^{th}$ day. Furthermore, another card may have a change in the taxes owed value as it accumulates from the $1^{st}$ day to the $14^{th}$ day, etc. As another example, if the system employs predictive analytics to predict future estimates of the data values, the user could scroll beyond the current date seamlessly helping the user to browse and compare estimated data in the future with respect to current to past data just as if the user was comparing two already existing data values.

Some of the cards may include data that does not change over time. For example, a card may include a list of urgent due dates for the selected time period. When the user moves the handle along the time bar, the car including the list of urgent due dates may not change but may remain statically displayed even though other cards are changing.

The benefits of the example embodiments include enabling a viewer to view how data changes over time, and also compare different data values changing over time, at the same time (i.e., simultaneously). The cards may include different data values. Therefore, the user can see how the different data values change over time. Also, the cards may include comparison data displayed therein (e.g., a previous month's data, a previous year's data) which can be compared with the time-series data of the currently selected time period. Furthermore, the time bar itself provides the user with a novel mechanism for moving through time.

FIG. 1 illustrates a system architecture of a database 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110.

According to various embodiments, the application 145 may include a user interface that displays the time bar and the graphical modules that are described herein. As a non-limiting example, the time bar and the graphical modules may be embedded within software code of the application 145. As another example, the time bar and the graphical modules may be implemented within a library that is accessible to applications 145 and/or services 135 that are running on the server 130 and remotely connected to the server 130 via external systems.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. In various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

The data (e.g., data records, data entries, documents, etc.) which include personal data may be stored, modified, deleted, and the like, within the data store 110. As an example, data may be created, written, modified, or deleted based on instructions from any of the applications 145, the services 135, and the like. Each piece of data may be assigned a globally unique identifier (GUID) by an operating system, or other program of the database 100. The GUID is used to uniquely identify that data from among all other data stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

FIG. 2A illustrates a user interface 200A which includes a time bar 201 and a plurality of display modules 210A, 220A, 230A, 240A, 250A, and 260A, which are also referred to herein as cards which may display time dependent and/or time independent data. In this example, the time bar 201 includes a plurality of indents 202 which represent a plurality of time units respectively. In this case, the indents 202 represent days of a month. Rather than display an indent on the first time unit (first day of the month) and a last time unit (last day of the month), the time bar includes numerical values 205 and 206 representing the first day of the month 205 and the last day of the month 206. Here, the time bar 201 includes 30 units of time which include the first numerical value 205 for the first time unit, twenty-eight indents 202 for the intermediate 28 days, respectively, and a second numerical value 206 representing the last time unit on the time bar 201. Each of the indents 202 are equally spaced apart from each other and are the same size.

The time bar 201 also includes a handle 203 which is used to select a time unit on the time bar 201. The handle 203 is overlaid on top of the time bar 201 thereby hiding the indent that it is currently selecting. In this example, the 14$^{th}$ indent 202 (corresponding to the fifteenth day of the month) is selected and it is hidden by the handle 203. In some embodiments, the handle 203 may also hide one or more adjacent indents 202 with respect to the currently selected indent. To enable the user to understand which time unit is selected, the handle 203 includes a display area 204 which displays a numerical value of the time unit that is currently selected. In this case, the selected time unit is the 15$^{th}$ time unit corresponding to the 15$^{th}$ day of the month. The display area 204 of the handle 203 may include a background of a solid color (e.g., white, grey, light blue, pink, etc.) and the numerical value may be displayed with a different color (e.g., black, brown, dark blue, red, etc.).

The handle 203 can be moved over an indent 202 by a user placing a cursor on top of the handle 203 and performing a hold-and-drag input. As another example, the user may move the handle 203 by placing the cursor (e.g., a mouse cursor, a touch, etc.) on one of the time units on the time bar 201 and inputting a single click. For example, the user may place a cursor on the first numerical value 205 and click the input mechanism once which causes the handle 203 to move leftward by one indent 202. As another example, the user may place the cursor on an indent positioned between the first numerical value 205 and the handle 203 and input a click causing the handle 203 to move rightward by one indent 202. As another example, the user may click on the second numerical value 206 and click on the input mechanism three times causing the handle 203 to move rightward by three indents 202. It is also possible that the time bar 201 may include scroll tabs (not shown) which may be clicked on to perform the same functions.

In the example of FIG. 2A, the time units including the first numerical value 205, the indents 202, and the second numerical value 206 within the time bar 201 correspond to days of the month (in this case 30 days of the month of June). However, the time units in the time bar 201 may be used to represent different periods of time such as minutes, hours, days, weeks, months, quarters, years, etc. In order to change the granularity of the period of time, the user may input a specific mouse command (e.g., scroll up while the cursor is positioned somewhere on the time bar 201, etc.). As another example, the user interface may include a button, a tab, a menu, etc. which enables the user to change the granularity of the period of time. When the granularity is changed, the number of indents 202 may change and the numerical values 205 and 206 may change as well.

Granularity of period of time can also be automated based on available horizontal screen space, permissible number of indents, time period selected by user, and the like. For example, a screen size may be 1028 pixels and user input time duration on the time bar may include 30 days that are represented by 30 indents of 34 pixels each which is easily readable and can be distinguished from another. Hence a granularity is automatically selected as days. In another example, if selected time period by user is 365 days, the system may generate 365 indents of 3 pixels each which is difficult to visually represent and also not usable. So, data will be aggregated at first level which then makes it 48 weeks (48 indents) which is possible for such a big screen and so default granularity is automatically chosen as week data. Consider if the same data to be populated on a smart screen with lesser horizontal screen size. So, for a smartphone screen if its defined that a maximum of 15 indents are usable, the data will further be consolidated to $2^{nd}$ level and default granularity then becomes month data. Thus, the system can store a maximum threshold of indents which can be used to identify how the granularity of time should be displayed. As noted, the maximum threshold may be based on a maximum number of indents, or it may be based a maximum number of pixels per indent. The maximum threshold can be compared to the current amount of time to be displayed on the time bar to determine how the granularity of the indents on the time bar.

The indents 202 may be sequentially aligned on a horizontal plane or line that runs continuously from the first numerical value 205 to the second numerical value 206. In this case, both the indents 202 and the numerical values 205 and 206 may be disposed at a same pixel height (or height) on the screen as each other. Thus, the indents 202 and the numerical values 205 and 206 may form a straight line with blank spaces in between each of the indents 202 and between a first indent 202 and the numerical value 205, and the last indent 202 and the numerical value 206. By displaying numerical values 205 and 206 at the opposing ends of the time bar 201, a user has a point of reference for the time unit on which the handle 203 is disposed. Furthermore, additional space is not needed above or below the time bar 201 to accommodate for year values, month values, day values, etc. of the time units because the first numerical value 205 and the second numerical value 206 provide enough detail to suffice. Also, the numerical values 205 and 206 are interactive in that a user can click on these numerical values 205 and 206 and cause the handle 203 to slide leftward and rightward on the time bar 201, respectively.

Rather than skip over time units, the time bar 201 may represent each time unit from a period of selection based on an equally-spaced apart and predefined granularity. For example, the time bar 201 may include a total of 31 time units representing 31 days of a selected month. As another example, the time bar 201 may include 12 time units representing 12 months of a selected year. As another example, the time bar 201 may include 24 time units representing 24 hours in a day. Various other examples are possible. Also, the time period may be customized to any desired range of time.

Also, the user may go forward or backward in time with respect to a currently selected time period by one or more time periods (e.g., months, etc.) by inputting a command on the period button 209 and selecting a different month (e.g., May, July, etc.) with respect to the current month of June. In this case, the time bar 201 would change the number of indents 202 to represent the number of days in the month. For example, if the selected month changes from June to July, the time bar would add an indent 202 to include 29 indents 202 rather than the 28 indents that were needed for June.

In addition, the user interface 200A may provide the user with data, in this example tax data, for a plurality of different countries. In this case, a currently selected country 207 is Germany. The user may change the country, and the data shown in the cards 210A-260A by selecting a different country.

Each of the cards 210A-260A may include different content. By content, it may not be limited to data visualizations alone. A card can also include other data such as user notes or comments which will auto scroll to the next section within the card where comments or notes posted on the selected day on the timeline is displayed. In the example of FIG. 2A, the first card 210A includes a graph of a value of taxes payable over time. In particular, a first graph 211 represents taxes payable from the first unit on the time bar corresponding to the first numeral 205 to a selected time unit on the time bar. In this case, the first unit on the time bar corresponds to the first day of the month and the selected time unit corresponds to the $15^{th}$ day of the month. Therefore, the first graph 211 represents the taxes payable of the current month from the $1^{st}$ to the $15^{th}$. In addition. A second graph 212 shows the taxes payable for the same month in the immediately previous year from the $1^{st}$ to the $15^{th}$ of that month. This allows the user to easily understand the differences between the two values.

Card 220A includes a graph 221 representing a value for taxes receivable over time for the current month, and a graph 222 representing the value for taxes receive for the same month in the previous year. Card 230A includes a graph 231 of a value for net payable over time for the current month, and a graph 232 for the value of net payable for the same month in the previous year. It should also be appreciated, that the comparison of graphs is not limited to the previous year. As another example, the comparison may be between different months of the same year, etc. such as the month of May compared to the month of June, etc. As further described in the examples of FIGS. 2B and 2C, when the user moves the handle 203 along the time bar 201, the graphs 211, 212, 221, 222, 231, and 232, within the cards 210A, 210B, and 210C, will change to reflect the change in days that have been selected.

The graphs may be any kind of graphs such as line graphs, bar graphs, pie charts, and the like. The graphs are not limited to any kind of graphs. Also, the cards 210A-260A may not display graphs, but may display other graphical features such as tokens, buttons, text content such as user notes and comments, images, and the like. In some embodiments, the cards 240A, 250A, and 260A include static content that does not change. As an example, the static content may include urgent reminders, pending deadlines for the particular month that has been selected, and other features. Here, the cards may provide "view all" tabs that allow the user to further drill-down into the cards 240A, 250A, and 260A.

FIG. 2B illustrates an example of a user interacting with the time bar 201 within the user interface 200B to cause the handle 203 to slide leftward along the time bar 201. In this example, the user may move a cursor or touch input over the numerical value 205 and inputs a click (e.g., mouse click, touch input, etc.) which causes the handle 203 to move leftward by one indent 202. Each click causes the handle to move another indent 202. Each time the handle 203 moves to a different indent 202, the display area 204 of the handle changes the value that is displayed therein. Here, the user clicks on the first numerical value 205 six times causing the handle 203 to move left by six indents 202 onto the $9^{th}$ day of the month or the $8^{th}$ indent 202.

Here, the change of position of the handle 203 is represented by its initial position 203A prior to the user entering any clicks on the numerical value 205 and its final position 203B after the user enters the six clicks. When the handle 203 moves to a different indent 202, the content within some of the cards changes. For example, cards 210B, 220B, and 230B shown in FIG. 2B include different content than cards 210A, 220A, and 230A as shown in FIG. 2A. In particular the accumulation of data has changed from 15 days to 9 days based on the change of the selected time unit on the time bar 201. However, the content within the cards 240A, 250A, and 260A remains static and does not change.

FIG. 2C illustrates an example of a user interacting with the time bar 201 in the user interface 200C to cause the handle 203 to slide rightward along the time bar 201. In this example, the user may move a cursor or touch input over the numerical value 206 and inputs a click (e.g., mouse click, touch input, etc.) which causes the handle 203 to move leftward by one indent 202. Each time the handle 203 moves to a different indent 202, the display area 204 of the handle changes the value that is displayed therein. Here, the user clicks on the first numerical value 206 five different times causing the handle 203 to move right by five indents 202 onto the $20^{th}$ day of the month or the $19^{th}$ indent 202.

Here, the change of position of the handle 203 is represented by its initial position 203A prior to the user entering any clicks on the numerical value 206 and its final position 203C after the user enters the five clicks. In this example, the content of the cards 210C, 220C, and 230C shown in FIG. 2C include different content than cards 210A, 220A, and 230A as shown in FIG. 2A. In particular the accumulation of data has changed from 15 days to 20 days based on the change of the selected time unit on the time bar 201. However, the content within the cards 240A, 250A, and 260A remains static and does not change.

In this example, the user has moved forward in time into the future (i.e., a day that has not yet occurred). However, underlying predictive analytics can be used to predict future values for the data value. In this example, the line is different based on whether the graph is actual data (unbroken line) or predicted data (broken line). For example, graph portion 211A includes actual values of tax payable up to a current data while graph portion 211B includes predicted values for the tax payable from the current day to a future day selected by the handle 203 on the time bar 201. Likewise, graph portion 221A includes actual values for tax receivable up to a current day and graph portion 221B includes predicted values for tax receivables from the current day to the future day selected by the handle 203 on the time bar 201. Furthermore, graph portion 231A includes actual values for net payable up to a current day and graph portion 231B includes predicted values for net payable from the current day to the future day selected by the handle 203 on the time bar 201.

In addition, the example of FIG. 2C includes an identifier 261 that has been displayed next to an unselected page of data (i.e., data from France) indicating that an urgent action is needed on this time unit on a different page (i.e., the unselected page) of data.

Figure 2D:
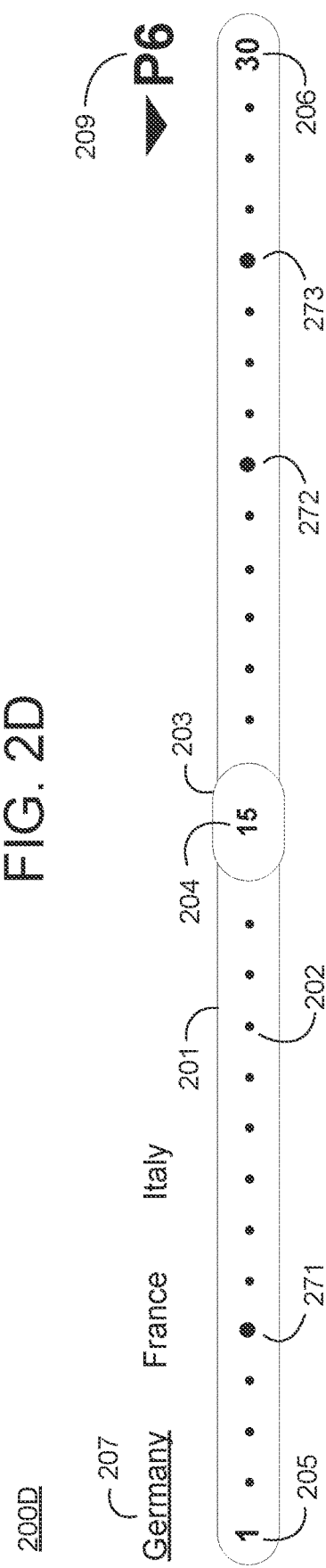
FIGS. 2D-2E are diagrams illustrating an additional process of interacting with the time bar in accordance with an example embodiment.
Figure 2E:
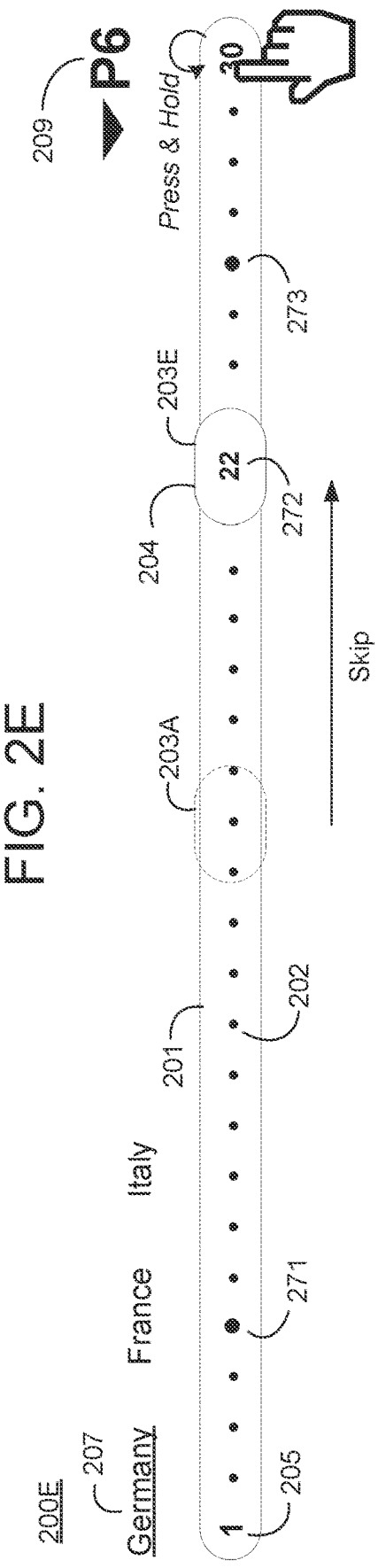

FIGS. 2D-2E illustrate another aspect of the time bar 201. Referring to FIG. 2D, the user interface 200D outputs the time bar 201 which includes the same arrangement of numerical values 205 and 206, and indents 202 as in the user interface 200A of FIG. 2A. However, in this example, a subset of the indents 271, 272, and 273 are highlighted by the software (e.g., an application, etc.) The highlighted indents 271, 272, and 273 may represent deadlines, important reminders, appointments, etc. Now, referring to FIG. 2E, the user moves the cursor or touch input over the second numerical value 206, presses on the second numerical value 206 and holds down on the press for a predetermined period of time (e.g., 1 second, two seconds, etc.). In response, the application may move the handle 203 by multiple indents 202 at once. That is, the handle may skip from the currently selected time unit (the $15^{th}$) to a time unit of a next highlighted indent (e.g., the $22^{nd}$ time unit represented by highlighted indent 272).

In this case, different types of input can move the handle 203 different along the time bar 201. For example, the longer hold/press action may cause the handle to move a longer distance (i.e. more indents) along the time bar 201 while the single click action may cause the handle to move a shorter distance (one indent, etc.) on the time bar 201.

FIG. 3 illustrates a process 300 of loading data for populating a user interface (e.g., such as user interface 200A, etc.) in accordance with an example embodiment. Referring to FIG. 3, the time bar described herein may be implemented within a software application that is running on a host platform such as a web server, a cloud platform, a database, an on-premises server, a user device, or the like. The host platform may have access to a plurality of data stores 311, 312, and 313 which store data capable of being displayed via the user interface described herein. The data stores 311, 312, and 313 may be stored as tables, documents, binary large objects (blobs), or the like. The host platform also includes a loading module 320 which may extract data from the data stores 311, 312, and 313, for display on the user interface, in advance. As an example, the loading module 320 may create a temporary data structure which holds data for display on the user interface. The temporary data structure may be a table 330 which stores data in rows and columns. The table 330 may be stored in RAM, a cache, etc.

When the user interface is loaded, the user interface may send a call or other request to the loading module 320 which identifies the cards capable of being displayed by the user interface based on identifiers of data values in the call/request. The call/request may also identify the time period to be displayed within the time bar. For example, the time period may be a plurality of days, a plurality of weeks, a plurality of months, a plurality of years, or the like. In response, the loading module 320 may scan the data stores 311-313 to identify which cards/values have historical data corresponding to the time period that can be acquired in advance. In some embodiments, the loading module 320 may also scan the data stores 311-313 for machine learning data (future data values predicted by machine learning) for the time period that can be acquired in advance and used to populate the data/cards.

Next, the loading module 320 may generate a table 330 which includes a plurality of rows representing the plurality of time units included in the requested time period. As an example, if the time period includes thirty days, the table 330 may include thirty rows. The table 330 may also include a plurality of columns. For example, a column may be designated for the time periods. Each card/data value may also have a column in the table 330. The loading module 320 may acquire data values for each data value/card for each time unit in the period of time and store the data values with their corresponding time units in the table 330. As shown in FIG. 3, the table 330 includes a first column 331 for time units, a second column 332 for values to be populated in a first card, a third column 333 for values to be populated in a second card, a fourth column 334 to be populated in a third card, etc.

By storing the data values in advance in a table 330, the initial loading of the user interface may experience a slight delay. However, once the table 330 has been built, the user interface can change the display of the cards without lag since all of the data necessary to change the data values is held in a single table in a fast memory (cache, RAM, etc.) In particular, the table 330 can be used to quickly retrieve data values based on the selected time units on the time bar, and output a display of the retrieved data values within the graphs. As the user moves the time bar on the user interface, the loading module 320 may retrieve data from the table 330 and output the data for display via the cards on the user interface.

Figure 4B:
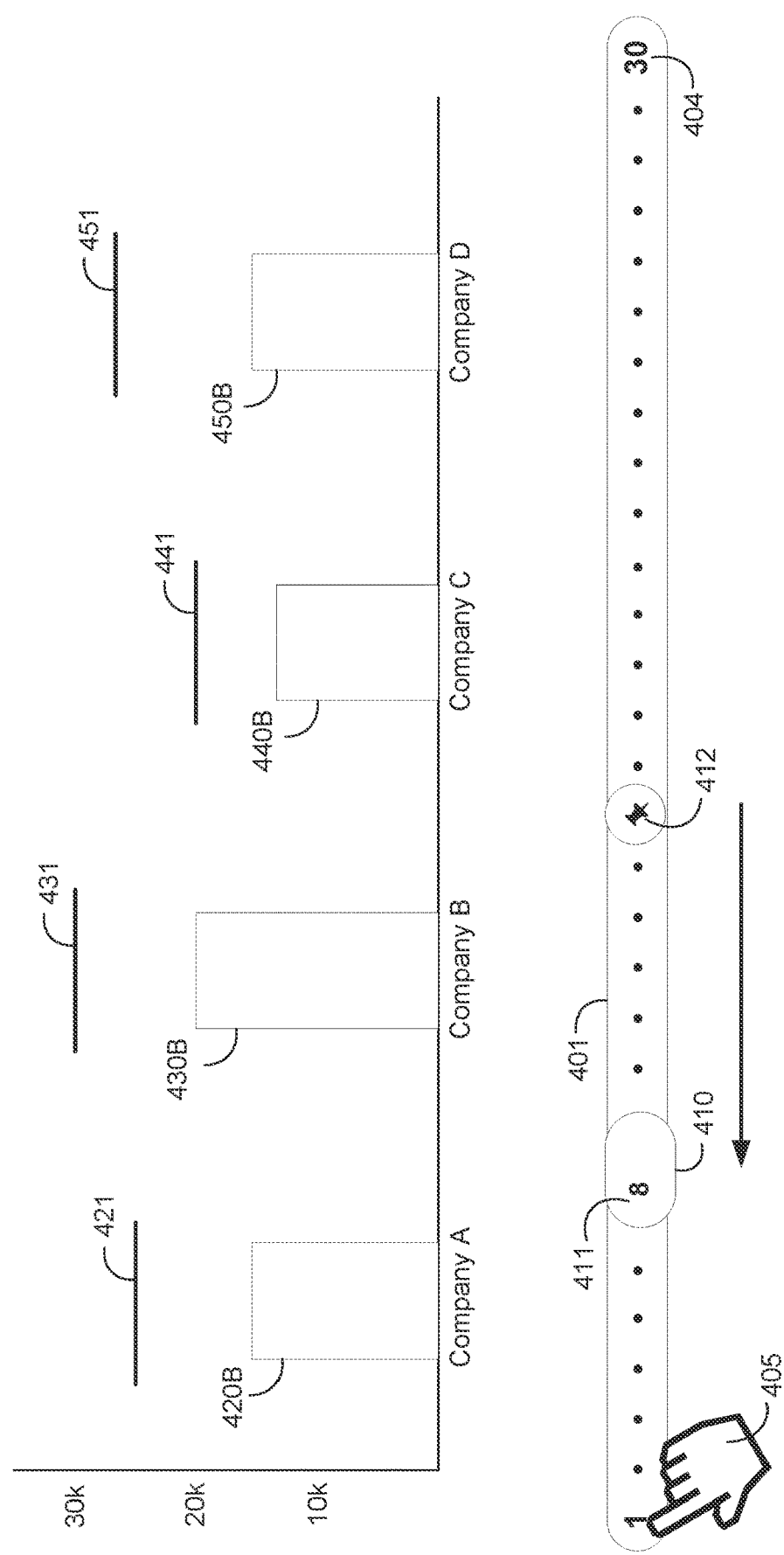

FIGS. 4A-4B illustrate processes of interacting with a user interface including a time bar and bar graphs in accordance with example embodiments. Referring to FIG. 4A, a process 400A of displaying a single card (graph 414) with a time bar 401 according to various embodiments is shown. The time bar 401 can be populated with units of time based on a period of time entered into a time travel field 413 of the user interface. In this example, the time bar 401 includes similar features as the time bar 201 shown in FIG. 2A including indents 402, a first numerical value 403, a second numerical value 404, and a handle 410 with a display area 411 displaying an identifier (number 15) of a selected time unit from the selected period of time. In addition, in this example, the display area 411 of the handle 410 also includes a pin element 412 that enables a user to pin a time unit to the time bar 401. This "pinning" function enables the user to pin data within the graph 414 and move the handle 410 to another day which will also be populated in the graph 414 at the same time for direct comparison.

In FIG. 4A, the graph 414 includes bar graphs 420A-450A representing data values of a currently selected time unit (the $15^{th}$) on the time bar 401. Here, the user may pin the currently selected time unit to the time bar 401 by moving a cursor 405 over the pin element 412 and clicking on the pin element 412. In response, the currently selected time unit may be pinned to the time bar 401 as shown in FIG. 4B. As shown, the pin element 412 is removed from the handle 410 and remains on the time bar 401 at the currently selected time unit, while the user moves the handle 410 along the time bar 401. Here, the user moves the handle 410 leftward by seven indents 402 to a newly selected time unit (e.g., the $8^{th}$ time unit or $8^{th}$ day) of the time period by clicking on the numerical value 403 with the cursor 405 seven times.

When the handle 410 is moved to the newly selected time unit, the graph 414 is updated/modified to include the data values of the newly selected time unit. Here, the modified graphs 420B, 430B, 440B, and 450B are created. However, the graph 414 continues to keep markers (content) of the pinned time unit. In this example, the graph 414 includes markers 421, 431, 441, and 451 on the graphs 420B, 430B, 440B, and 450B, respectively. Thus, a user can easily visualize a difference between the data values of the pinned time unit with respect to the newly selected time unit, the nature of the data values displayed, and also switch from absolute to relative when the user uses the pinning function.

Figure 4C:
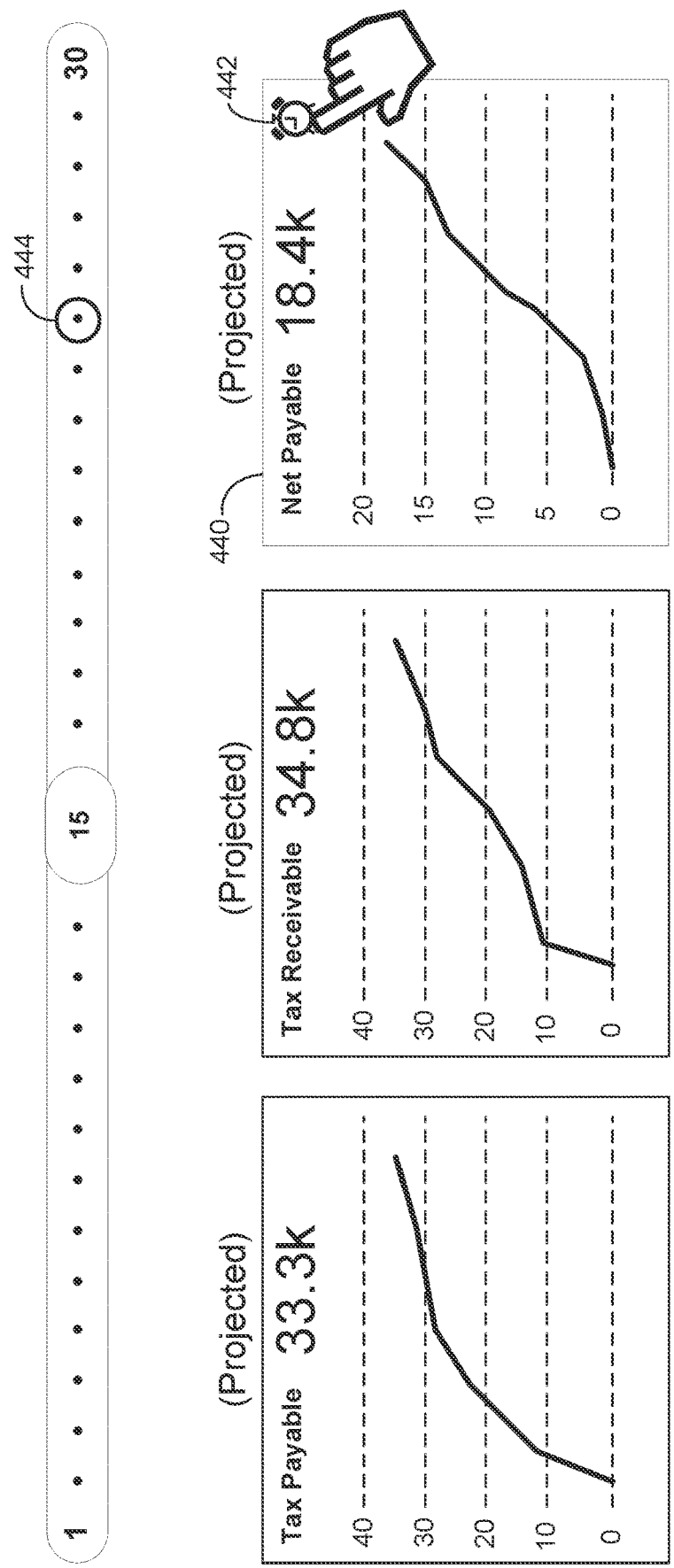
FIG. 4C is a diagram illustrating a process of setting a threshold of a projected value on the time bar in accordance with an example embodiment.

FIG. 4C illustrates a process 400C of setting a threshold of a projected value on the time bar in accordance with an example embodiment. FIG. 4C illustrates projected values for various cards including card 440. Here, the current day is the $15^{th}$ of the month, and the user is visualizing projected values for net payable. The user may set a cap corresponding to a projected value. Thus, the user interface gives the user an option to set capped values and monitor the trend for risk analysis. For example, the user may click on a notify button 442 which opens a box that allows the user to type in a threshold value. Making use of a singular user interface representing historical and predictive data, which helps the user predict if they are going to attain predefined thresholds and get notified beforehand if so.

As an example, an accountant may need to know if a payable amount exceeds 1M EUR at any given time (which is considered risky for the company). Hence, the user can set 1M EUR as a cap using the notify button 442 and in case predictive algorithms forecast a payable of more than 1M EUR, it can notify user about when is it going to happen and visually denote it on time bar as shown with a marker 444. Using predictive analytics, the time bar application can predict when the projected value will reach the threshold value and set a marker 444 on the time bar identifying when such threshold will be reached. Thus, the user will be notified of the predicted threshold and the corresponding card may become a static card. Also, the marker 444 or highlight can be placed on the time bar to help the user understand when and how soon threshold is going to be met.

Figure 4D:
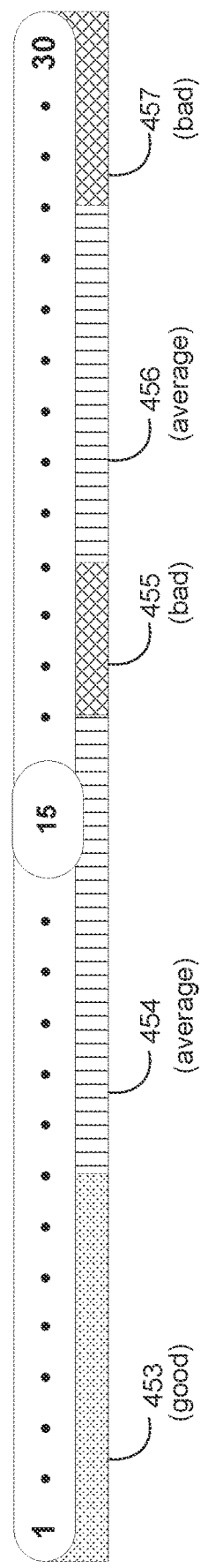
FIG. 4D is a diagram illustrating a process of tracking a KPI via the time bar in accordance with an example embodiment.

FIG. 4D illustrates a process 400D of tracking a KPI via the time bar in accordance with an example embodiment. Referring to FIG. 4D, a status of a KPI 451 can be tracked using highlights, colors, shading, etc. underneath the time bar as shown. For example, KPI's may be associated with a dashboard, and they may have defined states (e.g., good, average, bad, etc.) based on their values which may be represented by different colours or shading. The time bar can show the trend of the changing KPI values. Thus, user will know the current state and its behavior throughout the defined period. In FIG. 4D, a first shaded element 453 represents a good value for the KPI, a second shaded element 454 and a fourth shaded element 456 represents an average value for the KPI, and a third shaded element 455 and a fifth shaded element 457 represent a bad value for the KPI. In addition, a shaded element 452 may be displayed underneath or adjacent to the KPI identifier 451 based on a KPI value of a currently selected day on the time bar which in this example is the 15$^{th}$.

Figure 5A:
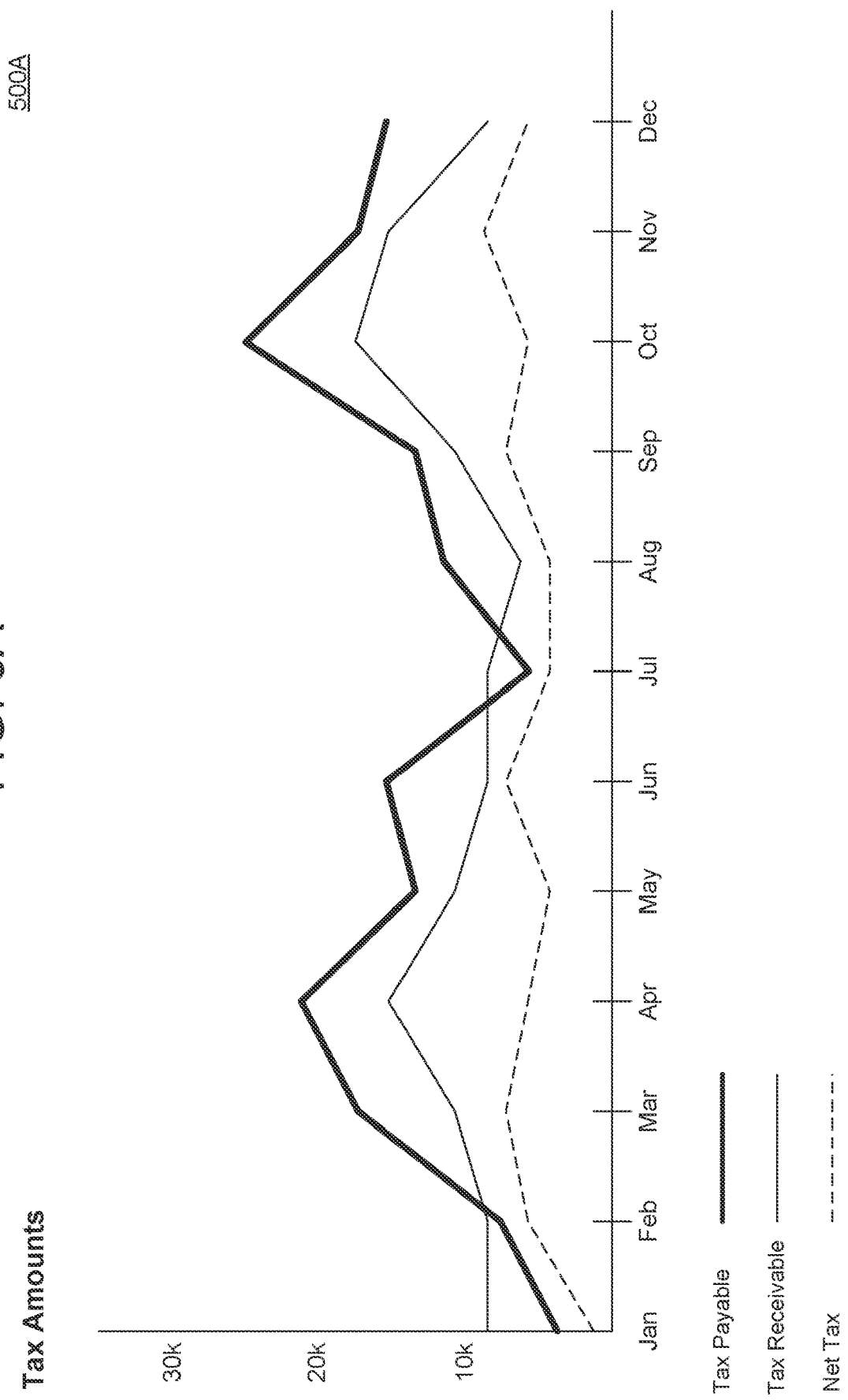

FIGS. 5A-5B illustrate a process of modifying a scale of a display in accordance with another example embodiment. Referring to FIG. 5A, a user interface 500A is shown in which tax amounts for a selected period of time (a year) are shown. Here, the user interface includes a graph in which the tax amounts are graphed over time based off of 12 time units corresponding to 12 months out of the year. The user interface 500A is an example of a card that can be included in any of the examples described herein. In this case, the screen size may be detected by the program and the number of time units used on the graph may be dynamically set based on the screen size. In the example of FIG. 5A, the screen is a desktop computer.

FIG. 5B illustrates an example of a user interface 500B displaying the same graph as shown in FIG. 5A. Here, the user has opened the user interface 500B on a different device (e.g., a tablet) having a smaller screen size. The software can detect the smaller screen size and automatically adjust the number of time units used in the graph. In other words, the software can scale down (or scale up) the number of time units on the time axis of the graph based on the screen size of the display device. Here, the time units are adjusted to quarterly instead of monthly to better fit the size of the screen. Accordingly, the software can automatically adjust the time units on the graph based on display size of a display device where the graph is being output.

FIG. 6 illustrates a method 600 of interacting with a time bar in accordance with an example embodiment. For example, the method 600 may be performed by a web server, a cloud platform, a user device, a database node, and the like. Referring to FIG. 6, in 610, the method may include displaying a time bar within a user interface, the time bar comprising a first numerical value of a first time unit, a second numerical value of a last time unit, a plurality of indents representing a plurality of intermediate time units which are arranged horizontally between the first and second numerical values and at a same height as the first and second numerical values, and a handle disposed over an indent of a currently selected time unit from among the plurality of intermediate time units.

In 620, the method may include displaying graphical modules via the user interface, wherein the graphical modules comprise visualizations of data based on the currently selected time unit. The time bar may be a horizontal bar with the graphical modules displayed underneath the time bar and the graphical modules may be rectangular-shaped modules (e.g., cards) with graphs and other data content displayed therein. However, the position of the cards and the horizontal bar is not limited thereto. As another example, the cards may be displayed above the time bar, or both above and below the time bar.

In 630, the method may include detecting, via a user input on the user interface, movement of the handle to a different selected time unit from among the plurality of intermediate time units. Furthermore, in 640, the method may include, in response to the detected movement, dynamically modifying one or more visualizations within one or more of the graphical modules based on data corresponding to the different selected time unit.

In some embodiments, the displaying the plurality of indents may include displaying a plurality of dots arranged in a horizontal line between the first and second numerical values and in parallel with the first and second numerical values, where each dot is spaced apart an equal distance. In some embodiments, the displaying the handle may include overlaying a button with a solid background on top of the time bar, and embedding a numerical value of the currently selected time unit within the solid background of the button.

In some embodiments, the detecting may include detecting one or more clicks on the first numerical value, and moving the handle leftward one or more indents toward the first numerical value on the time bar equal to the one or more clicks. In some embodiments, the detecting may include detecting one or more clicks on the second numerical value, and moving the handle rightward one or more indents toward the second numerical value on the time bar equal to the one or more clicks. In some embodiments, the detecting may include detecting a press and hold of a selection by a user on the second numerical value, and moving the handle a plurality of indents towards the second numerical value based on the press and hold.

In some embodiments, the displaying the graphical modules may include displaying a plurality of graphs including time-series data of a plurality of data values, each graph comprising a change in a time-series data value from the first time unit to the currently selected time unit. In some embodiments, the dynamically modifying the graphical modules may include dynamically modifying each graph to show a change in the time-series data value from the first time unit to the different selected time unit. In some embodiments, the displaying the time bar may further include identifying a time unit with a predefined event, and highlighting an indent on the time bar corresponding to the identified time unit with one or more of a different color and a different size than other indents.

Figure 7:
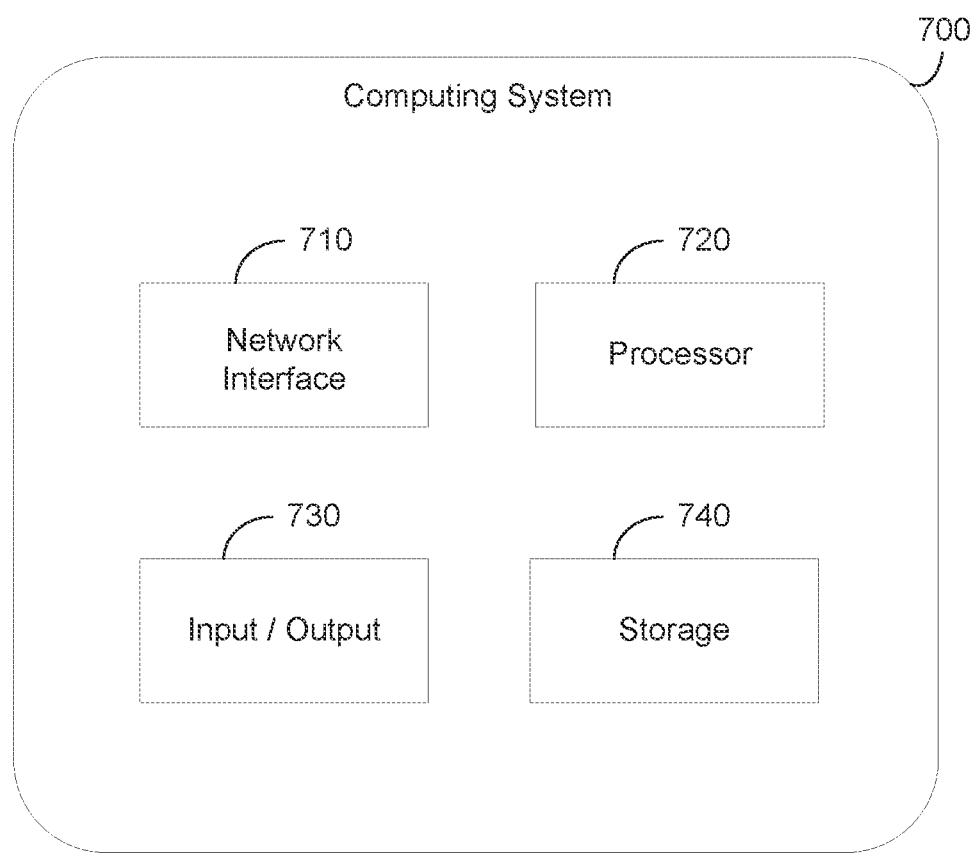
FIG. 7 is a diagram illustrating a computing system for use in any of the example embodiments described herein.

FIG. 7 illustrates a computing system 700 that can generate and manage the time bar and the graphical modules described herein, in accordance with an example embodiment. For example, the computing system 700 may be a web server, a database, a cloud platform, a user device, a server, or the like. In some embodiments, the computing system 700 may be distributed across multiple devices. Referring to FIG. 7, the computing system 700 includes a network interface 710, a processor 720, an output 730, and a storage device 740 such as a memory. Although not shown in FIG. 7, the computing system 700 may also include or be electronically connected to other components such as a display, an input unit, a receiver, a transmitter, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/ output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other non-transitory instructions which can be executed by the processor 720 to perform the methods and processes described herein. The storage 740 may include a data store having a plurality of tables, partitions, and sub-partitions. The storage 740 may be used to store database records, items, entries, and the like. Also, the storage 740 may be queried using SQL commands.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to:
   display a time bar within a user interface, the time bar comprising a first numerical value of a first time unit, a second numerical value of a last time unit, and a plurality of indents which are arranged as a plurality of non-numeric markings between the first and second numerical values,
   display a scroll handle overlaid on top of a currently-selected indent of a currently selected time unit from among the plurality of intermediate time units, wherein the scroll handle comprises a solid background that blocks visibility of the currently-selected indent from among the plurality of indents on the time bar when the scroll handle is positioned over the indent from among the plurality of indents;
   display graphical modules via the user interface, wherein the graphical modules comprise visualizations of data based on the currently selected time unit;
   detect, via a user input on the user interface, an input of sliding the scroll handle from on top of the currently-selected indent of the currently selected time to on top of a different indent of a different intermediate time unit from among the plurality of intermediate time units; and
   in response to the detected input, move the scroll handle over the top of the different indent causing a visibility of the different indent to be blocked by the scroll handle, cause a numerical value of the different intermediate time unit of the blocked different indent to appear within the solid background of the scroll handle and dynamically modify one or more visualizations within one or more of the graphical modules based on data corresponding to the different selected time unit.

2. The computing system of claim 1, wherein the plurality of indents comprise a plurality of dots arranged along a horizontal axis between the first and second numerical values and in parallel with the first and second numerical values, where each dot is spaced apart an equal distance.

3. The computing system of claim 1, wherein the scroll handle comprises a button overlaid on top of the time bar, and a numerical value embedded within the solid background of the button.

4. The computing system of claim 1, wherein the processor is configured to detect one or more clicks on the first numerical value, and move the scroll handle leftward one or more indents toward the first numerical value on the time bar corresponding to the one or more clicks, respectively.

5. The computing system of claim 1, wherein the processor is configured to detect one or more clicks on the second numerical value, and move the scroll handle rightward one or more indents toward the second numerical value on the time bar corresponding to the one or more clicks, respectively.

6. The computing system of claim 1, wherein the processor is configured to detect a press and hold of a selection by a user on the second numerical value, and move the scroll handle a plurality of indents towards the second numerical value based on the press and hold.

7. The computing system of claim 1, wherein the processor is configured to display a plurality of graphs including time-series data of a plurality of data values, each graph comprising a change in a time-series data value from the first time unit to the currently selected time unit.

8. The computing system of claim 7, wherein the processor is configured to dynamically modify each graph to show a change in the time-series data value from the currently selected intermediate time unit to the different intermediate time unit.

9. The computing system of claim 1, wherein the processor is further configured to identify an intermediate time unit with a predefined event, and highlight an indent on the time bar from among the plurality of indents corresponding to the identified intermediate time unit with one or more of a different color and a different size than other indents.

10. The computing system of claim 1, wherein the processor is configured to dynamically determine a granularity of time to be represented by the plurality of indents based on a number of pixels on a display attached to the computing system and a total amount of time to be represented by the time bar.

11. The computing system of claim 1, wherein the processor is configured to detect an input on a graphical module displaying a static visualization and convert the static visualization into a time-based browse-able user interface.

12. The computing system of claim 1, wherein the processor is further configured to:
    detect a pin command entered via a pin function on the scroll handle, where the pin command pins a first selected time unit to the time bar;
    move the scroll handle to a second selected time unit on the time bar based on a scroll command entered via the time bar; and
    simultaneously display a visualization of a data value based on the pinned selected time unit and a visualization of the data value based on the second selected time unit, within a card.

13. A method comprising:
    displaying a time bar within a user interface, the time bar comprising a first numerical value of a first time unit, a second numerical value of a last time unit, and a plurality of indents which are arranged as a plurality of non-numeric markings between the first and second numerical values, and displaying a scroll handle overlaid on top of a currently-selected indent of a currently selected time unit from among the plurality of intermediate time units, wherein the scroll handle comprises a solid background that blocks visibility of the currently-selected indent from among the plurality of indents on the time bar when the scroll handle is positioned over the indent from among the plurality of indents;
    displaying graphical modules via the user interface, wherein the graphical modules comprise visualizations of data based on the currently selected time unit;
    detecting, via a user input on the user interface, an input of sliding the scroll handle from on top of the currently-selected indent of the currently selected time to on top of a different indent of a different intermediate time unit from among the plurality of intermediate time units; and
    in response to the detected input, moving the scroll handle over the top of the different indent causing a visibility of the different indent to be blocked by the scroll handle, causing a numerical value of the different intermediate time unit of the blocked different indent to appear within the solid background of the scroll handle and dynamically modifying one or more visualizations within one or more of the graphical modules based on data corresponding to the different selected time unit.

14. The method of claim 13, wherein the displaying the plurality of indents comprise a plurality of dots arranged along a horizontal axis between the first and second numerical values and in parallel with the first and second numerical values, where each dot is spaced apart an equal distance.

15. The method of claim 13, wherein the scroll handle comprises a button overlaid on top of the time bar, and a numerical value embedded within the solid background of the button.

16. The method of claim 13, wherein the detecting comprises detecting one or more clicks on the first numerical value, and moving the scroll handle leftward one or more indents toward the first numerical value on the time bar corresponding to the one or more clicks, respectively.

17. The method of claim 13, wherein the detecting comprises detecting one or more clicks on the second numerical value, and moving the scroll handle rightward one or more indents toward the second numerical value on the time bar corresponding to the one or more clicks.

18. The method of claim 13, wherein the detecting comprises detecting a press and hold of a selection by a user on the second numerical value, and moving the scroll handle a plurality of indents towards the second numerical value based on the press and hold.

19. The method of claim 13, wherein the displaying the graphical modules comprises displaying a plurality of graphs including time-series data of a plurality of data values, each graph comprising a change in a time-series data value from the first time unit to the currently selected time unit.

20. A non-transitory computer-readable medium storing instructions which when executed by a processor cause a computer to perform a method comprising:
    displaying a time bar within a user interface, the time bar comprising a first numerical value of a first time unit, a second numerical value of a last time unit, and a plurality of indents which are arranged as a plurality of non-numeric markings between the first and second numerical values, and displaying a scroll handle overlaid on top of a currently-selected indent of a currently selected time unit from among the plurality of intermediate time units, wherein the scroll handle comprises a solid background that blocks visibility of the currently-selected indent from among the plurality of indents on the time bar when the scroll handle is positioned over the indent from among the plurality of indents;
    displaying graphical modules via the user interface, wherein the graphical modules comprise visualizations of data based on the currently selected time unit;
    detecting, via a user input on the user interface, an input of sliding the scroll handle from on top of the currently-selected indent of the currently selected time to on top of a different indent of to a different intermediate time unit from among the plurality of intermediate time units; and
    in response to the detected input, moving the scroll handle over the top of the different indent causing a visibility of the different indent to be blocked by the scroll handle, causing a numerical value of the different intermediate time unit of the blocked different indent to appear within the solid background of the scroll handle and dynamically modifying one or more visualizations within one or more of the graphical modules based on data corresponding to the different selected time unit.

21. The computing system of claim 1, wherein the processor only displays a numerical value of one intermediate time unit at a time from among a plurality of numerical values of the plurality of intermediate time units based on a position of the scroll handle.

\* \* \* \* \*